(12) United States Patent
Eliáš et al.

(10) Patent No.: US 9,298,448 B2
(45) Date of Patent: Mar. 29, 2016

(54) SYSTEM AND METHOD FOR RUN TIME DEPENDENCY RESOLUTION

(71) Applicant: Red Hat, Inc., Raleigh, NC (US)

(72) Inventors: Filip Eliáš, Vysni Lhoty (CZ); Filip Nguyen, Brno (CZ)

(73) Assignee: RED HAT, INC., Raleigh, NC (US)

( * ) Notice: Subject to any disclaimer, the term of this patent is extended or adjusted under 35 U.S.C. 154(b) by 188 days.

(21) Appl. No.: 13/898,900

(22) Filed: May 21, 2013

(65) Prior Publication Data

US 2014/0351802 A1 Nov. 27, 2014

(51) Int. Cl.
*G06F 9/44* (2006.01)

(52) U.S. Cl.
CPC ........................................ *G06F 8/70* (2013.01)

(58) Field of Classification Search
None
See application file for complete search history.

(56) References Cited

U.S. PATENT DOCUMENTS

| | | | |
|---|---|---|---|
| 6,332,218 B1 * | 12/2001 | Walker et al. | 717/166 |
| 6,339,841 B1 * | 1/2002 | Merrick et al. | 717/166 |
| 6,442,753 B1 * | 8/2002 | Gerard et al. | 717/170 |
| 6,470,494 B1 * | 10/2002 | Chan et al. | 717/166 |
| 6,493,870 B1 * | 12/2002 | Madany et al. | 717/165 |
| 6,985,909 B2 | 1/2006 | Blohm | |
| 7,013,459 B2 * | 3/2006 | Kuch | G06F 9/44557 711/165 |
| 7,039,923 B2 | 5/2006 | Kumar et al. | |
| 7,051,324 B2 * | 5/2006 | Gissel et al. | 717/166 |
| 7,069,550 B2 | 6/2006 | Fraenkel et al. | |
| 7,178,140 B2 * | 2/2007 | Dmitriev | 717/166 |
| 7,243,346 B1 * | 7/2007 | Seth et al. | 717/163 |
| 7,496,909 B2 * | 2/2009 | Kuch | G06F 9/44557 711/165 |
| 7,724,158 B2 * | 5/2010 | Wu | G06F 9/4428 341/50 |
| 8,079,025 B2 * | 12/2011 | Marchant | 717/166 |
| 8,296,741 B1 | 10/2012 | Huang et al. | |
| 2003/0121031 A1 * | 6/2003 | Fraenkel et al. | 717/166 |

(Continued)

FOREIGN PATENT DOCUMENTS

WO    WO 0235312 A2    5/2002

OTHER PUBLICATIONS

Apache Maven from http://en.wikipedia.org/wiki/Apache_Maven, 8 pages total, retrieve date May 9, 2013.

(Continued)

*Primary Examiner* — Tuan Q. Dam
*Assistant Examiner* — Zheng Wei
(74) *Attorney, Agent, or Firm* — Haynes and Boone, LLP (57) ABSTRACT

A system and method of run time dependency resolution includes loading one or more dependency descriptors from an archive, determining that a class is to be loaded at run-time, selecting a first dependency descriptor from the one or more dependency descriptors based on information associated with the class, requesting the class from a dependency repository based on information associated with the class and information associated with the first dependency descriptor, receiving the class from the dependency repository, and loading the class. In some examples, the system and method further include determining a package for the dependency repository, loading the package, extracting a class file from the package, splitting the class file into one or more fragments, tagging each of the one or more fragments with information associated with the class file and the package, and transmitting each of the one or more tagged fragments to the dependency repository.

17 Claims, 6 Drawing Sheets

(56) References Cited

U.S. PATENT DOCUMENTS

| | | | |
|---|---|---|---|
| 2004/0015936 A1* | 1/2004 | Susarla et al. | 717/166 |
| 2004/0107291 A1* | 6/2004 | Gamo | G06F 9/445 709/232 |
| 2004/0261069 A1* | 12/2004 | Verbeke et al. | 717/166 |
| 2005/0155028 A1* | 7/2005 | Park | G06F 8/41 717/166 |
| 2005/0283776 A1* | 12/2005 | McPherson et al. | 717/162 |
| 2006/0041880 A1* | 2/2006 | Martin et al. | 717/166 |
| 2006/0117320 A1* | 6/2006 | Garms et al. | 718/105 |
| 2007/0061794 A1* | 3/2007 | Mausolf et al. | 717/162 |
| 2007/0180442 A1* | 8/2007 | Oi | 717/166 |
| 2007/0198974 A1* | 8/2007 | Branda et al. | 717/166 |
| 2007/0203944 A1* | 8/2007 | Batra et al. | 707/104.1 |
| 2007/0256069 A1* | 11/2007 | Blackman et al. | 717/170 |
| 2008/0126781 A1* | 5/2008 | Czajkowski et al. | 713/2 |
| 2008/0127157 A1* | 5/2008 | Burns et al. | 717/166 |
| 2008/0134161 A1* | 6/2008 | Chamieh | G06F 9/4436 717/166 |
| 2009/0106747 A1* | 4/2009 | Arcese | 717/166 |
| 2009/0125611 A1 | 5/2009 | Barsness et al. | |
| 2010/0131478 A1* | 5/2010 | Bauchot et al. | 707/695 |
| 2011/0078672 A1* | 3/2011 | Stark et al. | 717/166 |
| 2011/0283256 A1* | 11/2011 | Raundahl Gregersen et al. | 717/108 |
| 2012/0222023 A1* | 8/2012 | Petrovick | G06F 9/45504 717/166 |
| 2012/0324433 A1* | 12/2012 | Kabanov | 717/166 |

OTHER PUBLICATIONS

Run-Time Variability Through Component Dynamic Loading, http://homes.dcc.ufba.br/~flach/docs/Ferramentas-SBES-2004.pdf#page=76, Oct. 22, 2004, 99 pages total.

* cited by examiner

100

| Package ID | Version |
|---|---|
| junit | 4.0 |
| com.ourco.myproj | 1.1 |
| ⋮ | ⋮ |

110   120

131 (row 1)
132 (row 2)

| Group ID | Artifact ID | Version |
|---|---|---|
| junit | junit | 4.0 |
| com.ourco.myproj | my_project | 1.1 |
| ⋮ | ⋮ | ⋮ |

160   170   180

191 (row 1)
192 (row 2)

SYSTEM AND METHOD FOR RUN TIME DEPENDENCY RESOLUTION

BACKGROUND

The present disclosure relates generally to computing systems, and more particularly to run time dependency resolution.

As the value and use of information continues to increase, individuals and businesses seek additional ways to process and store information. One option is a computing system. Computing systems may vary in complexity from a single processor operating in relative isolation to large networks of interconnected processors. The interconnected processors may be in close proximity to each other or separated by great distances both physically and as distance is measured in computer networking terms. The interconnected processors may also work together in a closely cooperative fashion or in a loose weakly coupled fashion. Because technology and processing needs and requirements may vary between different applications, the structure and arrangement of the computing system may vary significantly between two different computing systems. The flexibility in computing systems allows them to be configured for both specific users, specific uses, or for more general purposes. Computing system may also include a variety of hardware and software components that may be configured to process, store, and communicate information based on the needs of the users and the applications.

Additionally, some examples of computing systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computing systems generally rely on one or more software components to deliver the services and information required by users and other systems. Software components typically work in cooperation with other software components and in many cases depend on the presence of these other software components in order to function properly. This reliance may often be managed by identifying and tracking the dependencies of one software component on others. As software components become increasingly more portable and flexible and are required to operate on different types of computing platforms, the handling of dependencies may become more complex as each computing platform may create different dependencies for the software components.

Accordingly, it would be desirable to provide improved dependency handling methods and systems for software components.

SUMMARY

According to one embodiment, a method of run-time dependency resolution includes loading one or more dependency descriptors from an archive, determining that a class is to be loaded at run-time, selecting a first dependency descriptor from the one or more dependency descriptors based on information associated with the class, requesting the class from a dependency repository based on information associated with the class and information associated with the first dependency descriptor, receiving the class from the dependency repository, and loading the class.

According to another embodiment, a non-transitory machine-readable medium comprising a first plurality of machine-readable instructions which when executed by one or more processors associated with one or more computing systems are adapted to cause the one or more processors to perform a method including loading one or more dependency descriptors from an archive, determining that a class is to be loaded at run-time, selecting a first dependency descriptor from the one or more dependency descriptors based on information associated with the class, requesting the class from a dependency repository based on information associated with the class and information associated with the first dependency descriptor, receiving the class from the dependency repository, and loading the class.

According to yet another embodiment, a system for management of dependencies includes a deployment platform including one or more processors and memory storing an archive and a dependency cluster including a plurality of dependency nodes. The one or more processors are running an augmented Java virtual machine (AJVM) including a class loader. The class loader loads a class at run-time as requested by the AJVM by selecting a dependency descriptor for the class based on information associated with the class, requesting the class from a first dependency node selected from the plurality of dependency nodes, and receiving the class from the first dependency node.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In the early days of computing, software developers often created software components or software projects entirely by themselves. As the complexity of software projects increased, it often became undesirable and inefficient to create all the elements of these software projects. Instead, software developers often rely on software libraries and packages to provide many features and elements of software projects. Each of these software libraries and packages often, themselves, rely on other software libraries and packages. Thus, in order to build or use a software project, the software developers and end users also need to have access to the relied upon software libraries and packages. This reliance is often formalized using one or more dependencies. The dependencies may be used by the build and/or target system to identify and/or locate the depended upon software libraries and packages so that they may be used by the software project.

Figure 1A:
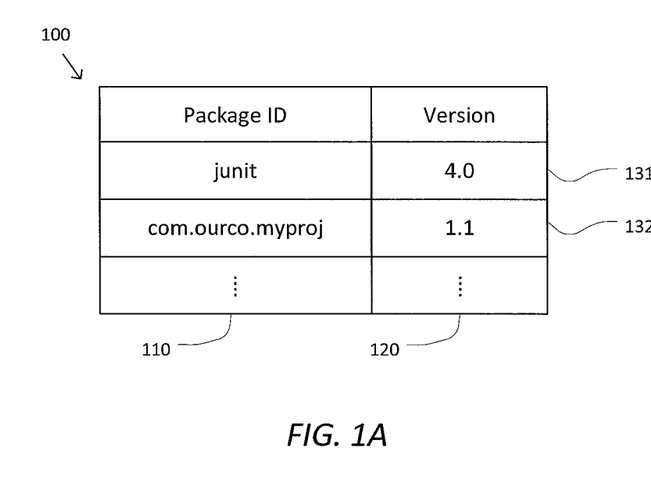
FIGS. 1A and 1B are simplified diagrams of dependency descriptor lists according to some examples.

FIG. 1A is a simplified diagram of a dependency descriptor list 100 according to some examples. As shown in FIG. 1A, the dependency descriptor list 100 may be represented in tabular form. Although the dependency descriptor list 100 is shown in tabular form, any suitable format may be used including extensible markup language (XML), comma separated values (CSV), and the like. In the table of FIG. 1A, each dependency descriptor in the dependency descriptor list 100 includes a package identifier or ID 110 and a version 120. Package ID 110 may be used to identify a package or a library on which a dependency exists. In some examples, package ID 110 should be sufficiently descriptive to identify the package or library. Because many packages and libraries come in different versions, version 120 may also be used to uniquely identify a version of a dependency from among many possible versions. The dependency descriptor list 100 is shown with two representative dependencies 131 and 132, although any number of dependencies may be included in dependency descriptor list 100. Dependency 131 describes a dependency on version 4.0 of junit. Dependency 132 describes a dependency on version 1.1 of a package with a package ID of com.ourco.myproj.

Figure 1B:
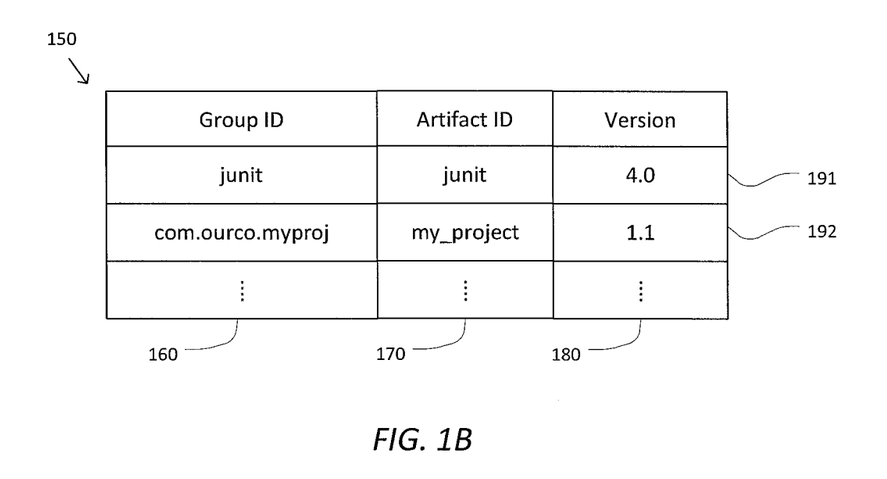

FIG. 1B is a simplified diagram of a dependency descriptor list 150 according to some examples. As shown in FIG. 1B, the dependency descriptor list 150 may be represented in tabular form. Although the dependency descriptor list 150 is shown in tabular form, any suitable format may be used including XML, CSV, and the like. In the table of FIG. 1B, each dependency descriptor in the dependency descriptor list 150 includes a group ID 160, an artifact ID 170, and a version 180. Collectively group ID 160 and artifact ID 170 may be used to identify a package or a library on which a dependency exists. In some examples, the combination of group ID 160 and artifact ID 170 should be sufficiently descriptive to identify the package or library. Because many packages and libraries come in different versions, version 180 may also be used to uniquely identify a version of a dependency from among many possible versions. The dependency descriptor list 150 is shown with two representative dependencies 191 and 192, although any number of dependencies may be included in dependency descriptor list 150. Dependency 191 describes a dependency on version 4.0 of junit, which may be identified using a group ID of junit, an artifact ID of junit, and a version of 4.0. Dependency 192 describes a dependency on version 1.1 of a package with a package ID of com.ourco.myproj, which may be represented by a group ID of com.ourco.myproj, an artifact ID of my_project, and a version of 1.1. In some examples, the dependency descriptors in the dependency descriptor list 150 may be consistent with dependency descriptors used with Maven, a build tool.

Figure 2:
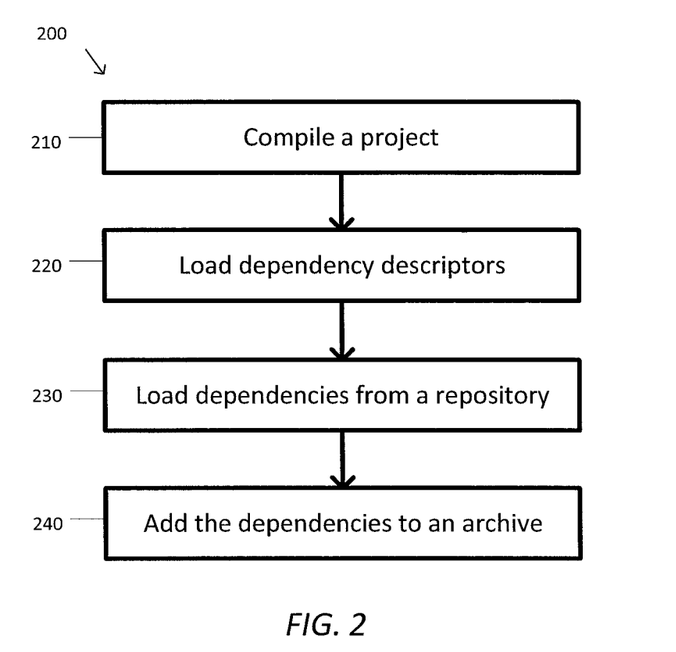
FIG. 2 is a simplified diagram of a method of building a software component using dependency descriptors according to some examples.

FIG. 2 is a simplified diagram of a method 200 of building a software component using dependency descriptors according to some examples. As shown in FIG. 2, the method 200 includes a process 210 for compiling a project, a process 220 for loading dependency descriptors, a process 230 for loading dependencies from a repository, and a process 240 for adding the dependencies to an archive. According to certain examples, the method 200 of building a software component using dependency descriptors can be performed using variations among the processes 210-240 as would be recognized by one of ordinary skill in the art. In some examples, one or more of the processes 210-240 of method 200 may be implemented, at least in part, in the form of executable code stored on non-transient, tangible, machine readable media that when run by one or more processors (e.g., one or more processors in a computer workstation) may cause the one or more processors to perform one or more of the processes 210-240.

At the process 210, a project is compiled. Once software for a project has been written, each source code file in the project may be compiled. During the compilation of each source code file, a compiler typically needs to find a description of each object and/or function referenced and/or used in the source code file. Many of these objects and functions are often described in other packages and/or software libraries. Although many techniques may be used to aid the compiler in finding the descriptions, in some examples, the descriptions may be found through use of dependency descriptors and dependency repositories.

At the process 220, dependency descriptors are loaded. During the compilation of process 210 and during other processes of build method 200, each of the dependencies for the project may be identified and resolved. When the dependencies are formalized using dependency descriptors, the dependency descriptors may be loaded by the build tool. In some examples, the dependency descriptors may be included in a build file. In some examples, the build file may be a Maven project object model. As each dependency descriptor is loaded, a corresponding package and version may be determined. In some examples, the dependency descriptors may be consistent with the dependencies descriptors of FIG. 1A and/or FIG. 1B.

At the process 230, the dependencies are loaded from a repository. To facilitate use of dependencies and dependency descriptors, the dependencies may be stored in a repository. In some examples, the repository may be stored in files local to a build workstation. In some examples, the repository may be hosted by a server. In some examples, the repository may be accessible using a network. In some examples, the repository may include multiple repositories. Using the package and version determined during process 220, each of the dependencies is loaded from the repository. Once loaded, the dependencies may be used by the compiler and during other build processes.

At the process 240, the dependencies are added to an archive. While only the description of each object and/or function is used by the compiler, a definition of each object and/or function may also be used during execution of the project on a target system. In some examples, the definition of each object and/or function may include compiled code for that object and/or function. In some examples, the compiled code may be a Java class file. In some examples, because it is not always known whether every target system for the project includes the definitions, the definitions for each dependency may be added to the archive used to distribute the project. In some examples, the definitions of some dependencies may be known to be present on the target system and may be omitted from the archive. In some examples, the archive may be a Java archive (JAR) file. In some examples, the archive may be a web archive (WAR) file. In some examples, the archive may be an enterprise archive (EAR) file.

According to some examples, adding each of the dependencies to the archive may not be very efficient. In some examples, adding each of the dependencies to the archive may result in large archive files. In some examples, the large archive files may use large amounts of storage space (e.g., on disk) and/or use large amounts of bandwidth to distribute. In some examples, each target system may already include copies of one or more of the dependencies added to the archive. In some examples, all of the dependencies may be added to the archive even though some target systems already store copies of one or more of the dependencies. In some examples, this may result in archives that are generally larger than many target systems need. In some examples, this may result in duplicate copies of the same dependency on the target systems, further consuming resources of those target systems. In some examples, different target systems may use different versions and/or variations of some dependencies. In some examples, this may result in different archives for each target system, each using resources of the build workstation. Accordingly, it would be desirable to load the dependencies at run time rather than assembling them at build time in the archive.

Figure 3:
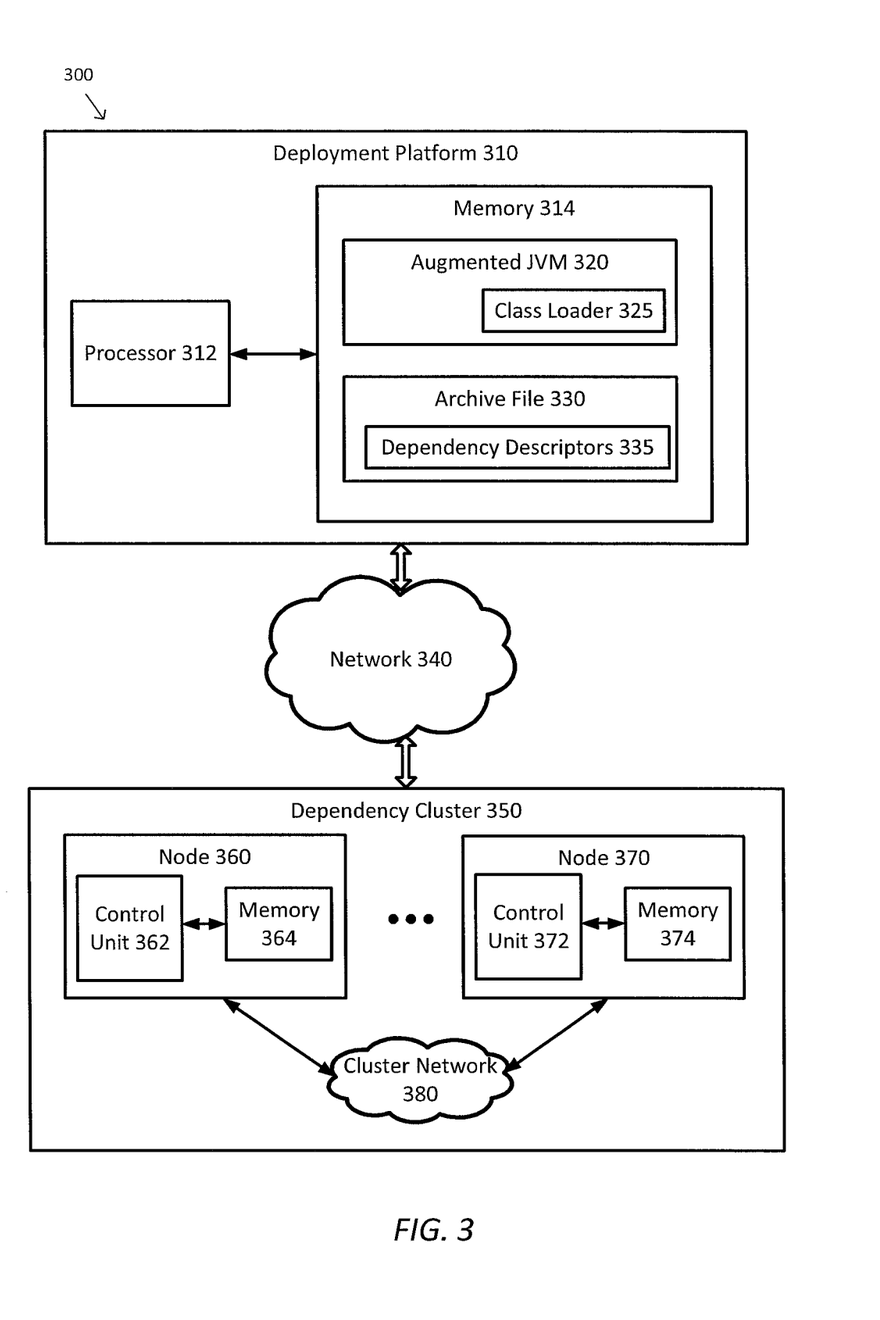
FIG. 3 is a simplified diagram of a run time dependency resolution system according to some examples.

FIG. 3 is a simplified diagram of a run time dependency resolution system 300 according to some examples. As shown in FIG. 3, system 300 includes a deployment platform 310. Deployment platform 310 is the target system on which a software project is intended to be executed. In some examples, deployment platform may be a standalone workstation, a cluster, a production server, within a virtual machine, and/or the like. Deployment platform 310 includes a processor 312 and memory 314. Processor 312 is coupled to memory 314. In some examples, processor 312 may control operation and/or execution of software packages on deployment platform 310. Although only one processor 312 is shown, deployment platform 310 may include multiple processors. Memory 314 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Memory 314 may further be used to store an augmented Java virtual machine (AJVM) 320 and an archive file 330. AJVM 320 is a virtual machine capable of executing complied Java code. In some examples, AJVM 320 may be a dependency augmented JVM. AJVM 320 includes several components for managing, loading, and executing Java projects. The components of the AJVM 320 include a class loader 325. Class loader 325 is used to load any classes that are used while a Java project executes. Archive file 330 may be an archive file used to distribute a Java project. In some examples, archive file 330 may be a JAR, a WAR, an EAR file, and/or the like. In contrast to the archive created during process 240, archive file 330 may include one or more dependency descriptors 335. In some examples, the dependency descriptors 335 may be included in the archive file 330 instead of the dependencies themselves. In some examples, the dependency descriptors 335 may be included in a dependency file stored in the archive file 330. In some examples, the dependency file may be stored in the META-INF and/or a similar metadata directory of the archive file 330. In some examples, the dependency descriptors 335 may be consistent with the dependency descriptors of FIG. 1A and/or FIG. 1B. In some examples, this may reduce a size of archive file 330.

In some examples, this may reduce a number of versions of archive file 330 used to support multiple deployment platforms.

In some examples, inclusion of the dependency descriptors 335 in archive file 330 may support run time dependency resolution by class loader 325 and AJVM 320. In some examples, the dependency descriptors 335 may be used by class loader 325 to load only those dependencies that are actually used during execution of the Java project in archive file 330. In some examples, the dependency descriptors 335 may be used by class loader 325 to load dependencies from a location other than archive file 330 and/or memory 314. In some examples, class loader 325 may load the dependencies from a dependency repository.

As further shown in FIG. 3, deployment platform 310 is coupled through a network 340 to dependency cluster 350. Network 340 may be any network including a local area network (LAN), a data center network, a wide area network (WAN), an autonomous system, an internet, and/or the like. Dependency cluster 350 is used to store a dependency archive to be used by class loader 325. Dependency cluster 350 includes one or more dependency nodes, including dependency nodes 360 and 370. Although only two dependency nodes are shown in dependency cluster 350, any number of dependency nodes may be used. In some examples, although dependency cluster 350 is shown coupled to deployment platform 310 using network 340, some portion of dependency cluster 350 may also be included in deployment platform 310.

Dependency node 360 includes a control unit 362 and memory 364. Control unit 362 is coupled to memory 364 and may control the operation of dependency node 360. In some examples, control unit 362 may be used to respond to requests for dependencies made from a class loader such as class loader 325. In some examples, control unit 362 may include one or more processors. In some examples, memory 364 may be used to store copies of some or all class files associated with a dependency. In some examples, memory 364 may store only portions of any given class file. Memory 364 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Similarly, dependency node 370 includes a control unit 372 and memory 374. Control unit 372 is coupled to memory 374 and may control the operation of dependency node 370. In some examples, control unit 372 may be used to respond to requests for dependencies made from a class loader such as class loader 325. In some examples, control unit 372 may include one or more processors. In some examples, memory 374 may be used to store copies of some or all class files associated with a dependency. In some examples, memory 374 may store only portions of any given class file. In some examples, memory 374 may store portions of a class file that overlap with portions stored in memory 364. Memory 374 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Dependency cluster 350 further includes a cluster network 380. Cluster network 380 may be used to couple together each of the dependency nodes 360, 370 in dependency cluster 350. In some examples, cluster network 380 may be partially and/or fully included in network 340. In some examples, cluster network 380 may form a peer-to-peer network between the dependency nodes 360, 370. In some examples, the peer-to-peer network may permit the dependency nodes 360, 370 to cooperate in responding to a dependency request for a class file. In some examples, the dependency nodes 360, 370 may cooperate in responding to the dependency request for the class file because each dependency node 360, 370 only stores a portion of the requested class file.

Figure 4:
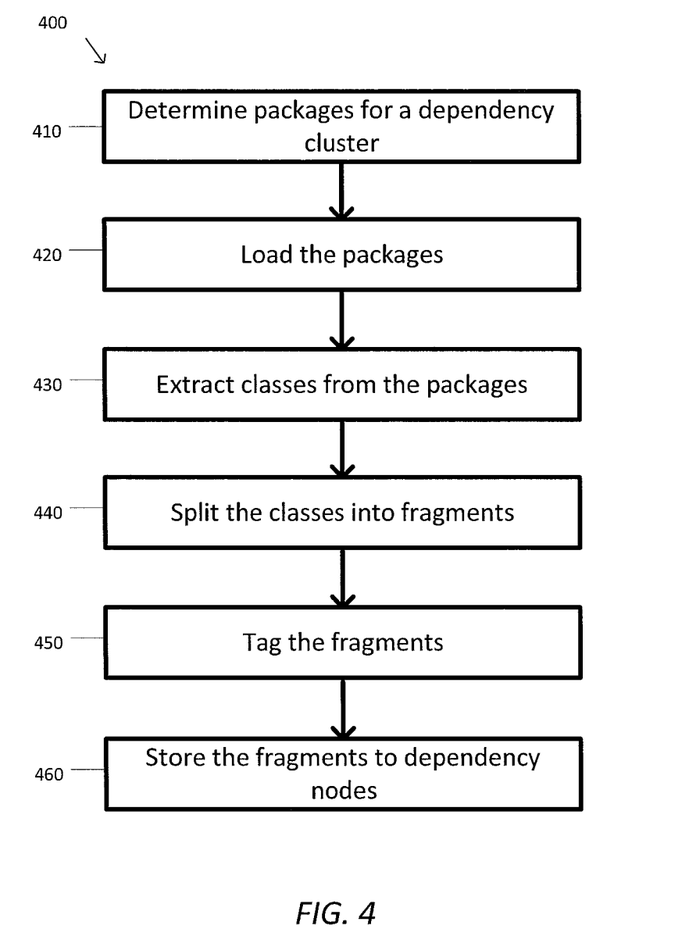
FIG. 4 is a simplified diagram of a method of populating a dependency cluster according to some examples.

FIG. 4 is a simplified diagram of a method 400 of populating a dependency cluster according to some examples. As shown in FIG. 4, the method 400 includes a process 410 for determining packages for a dependency cluster, a process 420 for loading the packages, a process 430 for extracting classes from the packages, a process 440 for splitting the classes into fragments, a process 450 for tagging the fragments, and a process 460 for storing the fragments to dependency nodes. According to certain examples, the method 400 of populating a dependency cluster can be performed using variations among the processes 410-460 as would be recognized by one of ordinary skill in the art. In some examples, one or more of the processes 410-460 of method 400 may be implemented, at least in part, in the form of executable code stored on non-transient, tangible, machine readable media that when run by one or more processors (e.g., one or more processors in a computer workstation and/or in control unit 362 and/or 372) may cause the one or more processors to perform one or more of the processes 410-460.

At the process 410, packages for a dependency cluster are determined. In order to support run time dependency resolution, a dependency cluster may be populated with one or more dependencies. In some examples, the dependency cluster may be the dependency cluster 350. In some examples, the one or more dependencies are associated with one or more packages. In some examples, the one or more packages are determined based on dependency descriptors included in a build file (e.g., the build file used during process 220). In some examples, when the dependency descriptors are included in the build file, method 400 may be part of a build process (e.g., as an enhancement to the build process of method 200). In some examples, the one or more packages are determined based on dependencies stored in an existing dependency archive. In some examples, when the dependencies are stored in an existing dependency archive, method 400 may be part of a mirroring process for the existing dependency archive.

At the process 420, the packages are loaded. Each of the packages determined during process 410 are loaded. In some examples, the packages are loaded from local memory, such as a disk drive. In some examples, the packages are loaded from a dependency archive, such as the dependency archive from process 410.

At the process 430, classes are extracted from the packages. Most packages include one or more classes. In some examples, each class may be stored in a class file. Each of the classes in each of the packages are extracted from respective packages for further processing.

At the process 440, the classes are split into fragments. Each of the classes may be split into smaller more manageable units called fragments, because each class varies in size. In some examples, each fragment includes a fixed number of bytes from a respective class file. In some examples, when each fragment is 1 k byte in size and a class file includes 10.4 kbytes, the class file may be split into 11 fragments. In some examples, a last fragment from a class may be smaller than the other fragments. In some examples, each fragment may be identified by a starting byte within the class file. In some examples, when each fragment is 1 k byte in size, the starting bytes may be 0, 1024, 2048, etc. In some examples, each fragment may be identified by a fragment number indicating an ordinal position of the respective fragment. In some examples, when each fragment is 1 k byte in size, a fragment with fragment number 0 may include bytes 0-1023 and a fragment with fragment number 3 may include bytes 3072-4095. In some examples, other strategies may be used to split each class into fragments.

At the process 450, the fragments are tagged. After each fragment is created, it is tagged with a tag so that it may be identified later. Each tag may include a package for the class from which the corresponding fragment was split during process 440. Each tag may also include the dependency descriptor associated with the package from which the class was extracted during process 430. Each tag may also include a starting byte and/or a fragment number corresponding to the fragment. In some examples, the tag may further include a total size of the corresponding class and/or a total number of fragments for the corresponding class. In some examples, the tag may further include a validation field for the corresponding class. In some examples, the validation field may include a checksum, a CRC value, an MD5 value, and/or the like that may support validation of a class file assembled from corresponding fragments. In some examples, only some of the tags for a class file may include the total size, the total number of fragments, and/or the validation field.

At the process 460, the fragments are stored to dependency nodes. Each of the fragments from process 440 and their corresponding tags from process 450 are transmitted to one or more dependency nodes (e.g., dependency nodes 360 and/or 370) in the dependency cluster for storage. In some examples, a number of copies of each fragment and corresponding tag stored in the dependency nodes may be based on a replication factor. In some examples, the replication factor may indicate the number of dependency nodes into which a copy of each fragment and corresponding tag may be stored. In some examples, when the replication factor is four, a copy of each fragment and corresponding tag may be stored in four separate dependency nodes. In some examples, the dependency nodes chosen for each fragment and corresponding tag may be selected based on a hashing mechanism. In some examples, the dependency nodes chosen for each fragment and corresponding tag may be selected randomly. In some examples, it is possible that no dependency node may store all the fragments for a particular class. In some examples, it is possible that a particular dependency node may not store any fragments for a particular class. In some examples, duplication of fragments among the dependency nodes may support high availability of dependencies from the dependency cluster. If some examples, when a replication factor of N is used, at least N dependency nodes may have to fail in order for the dependency cluster to be unable to provide a class when requested. In some examples, duplication of fragments among the dependency nodes may support load balancing among the dependency nodes because many dependency nodes are able to supply any given fragment. In some examples, this allows less busy dependency nodes to respond to a request for a fragment without have to wait on a dependency node that is busier.

Figure 5:
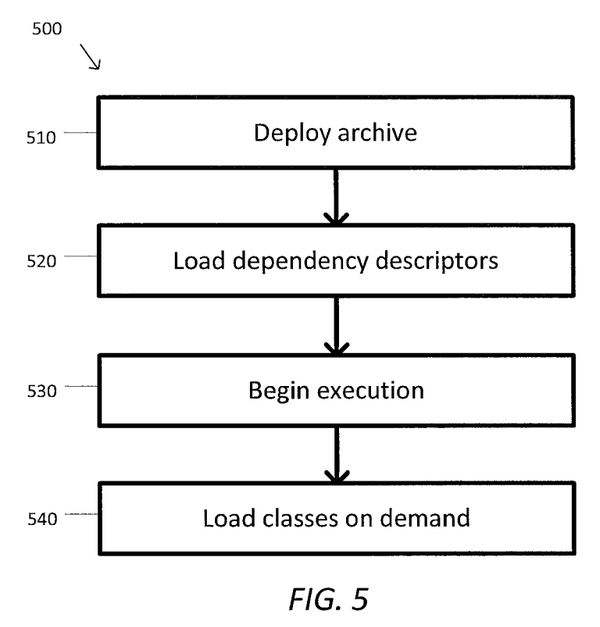
FIG. 5 is a simplified diagram of a method of run time dependency resolution according to some examples.

FIG. 5 is a simplified diagram of a method 500 of run time dependency resolution according to some examples. As shown in FIG. 5, the method 500 includes a process 510 for deploying an archive, a process 520 for loading dependency descriptors, a process 530 for beginning execution, and a process 540 for loading classes on demand. According to certain examples, the method 500 of run time dependency resolution can be performed using variations among the processes 510-540 as would be recognized by one of ordinary skill in the art. In some examples, one or more of the processes 510-540 of method 500 may be implemented, at least in part, in the form of executable code stored on non-transient, tangible, machine readable media that when run by one or more processors (e.g., processor 312 in deployment platform 310) may cause the one or more processors to perform one or more of the processes 510-540.

At the process 510, an archive is deployed. The archive is deployed on a deployment platform such as the deployment platform 310. In some examples, the archive is an archive file such as the archive file 335. In some examples, the archive may be deployed for on-demand execution when a server and/or an augmented Java virtual machine (AJVM), such as the AJVM 320, is started on the deployment platform. In some examples, the archive may be deployed when the archive is selected for execution. In some examples, the archive may be deployed when it is sent to the deployment platform. In some examples, the archive may deployed by extracting contents of the archive file and providing the contents to the AJVM.

At the process 520, dependency descriptors are loaded. During and/or after the archive is deployed during process 510, the dependency descriptors associated with the archive are loaded. In some examples, the dependency descriptors may be loaded by the AJVM. In some examples, the dependency descriptors may be loaded from a dependency file. In some examples, the dependency file may be store in the META-INF and/or a similar metadata directory of the archive file. In some examples, the dependency descriptors may be consistent with the dependency descriptors of FIG. 1A and/or FIG. 1B. In some examples, the dependency descriptors may be the dependency descriptors 335.

At the process 530, execution begins. Execution of the project in the archive begins in the AJVM. Execution may continue, subject to input/output and other run-time conditions, until an object and/or a file associated with a class that is not loaded is to be executed.

At the process 540, classes are loaded on demand. Using a class loader, such as the class loader 325, the AJVM requests that classes that are to be executed are loaded into main memory where the classes may be executed. In the AJVM this is typically handled in an on-demand fashion. Thus, classes are only loaded when necessary to limit an amount of main memory used by the project as it executes. In some examples, when the class to be loaded is already available in the main memory, the class loader may not be needed for that class. In some examples, when the class to be loaded is already available on the deployment platform (e.g., on a disk drive), the class loader loads the class to the main memory. In some examples, when the class to be loaded is not available on the deployment platform, the class may be located using a corresponding dependency descriptor and requested from a dependency respository.

Figure 6:
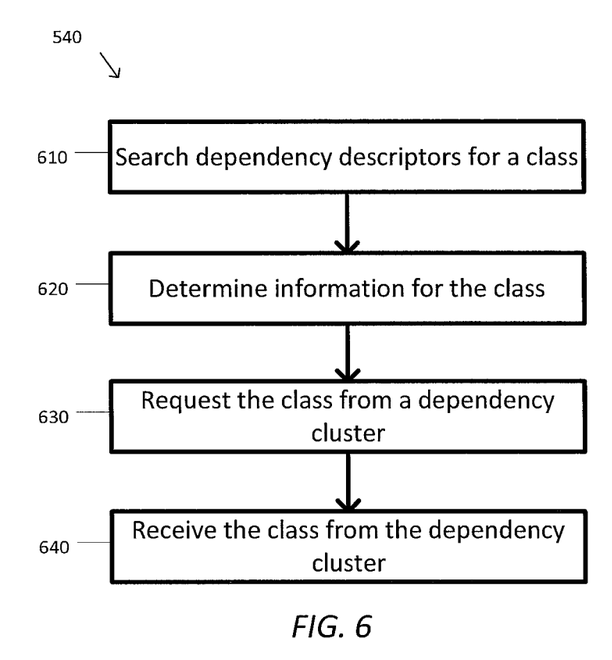
FIG. 6 is a simplified diagram of a process for loading a class from a dependency cluster according to some examples.

FIG. 6 is a simplified diagram of the process 540 for loading a class from a dependency cluster according to some examples. As shown in FIG. 6, the process 540 includes a process 610 for searching dependency descriptors for a class, a process 620 for determining information for the class, a process 630 for requesting the class from a dependency cluster, and a process 640 for receiving the class from the dependency cluster. According to certain examples, the process 540 for loading a class from a dependency cluster can be performed using variations among the processes 610-640 as would be recognized by one of ordinary skill in the art. In some examples, one or more of the processes 610-640 of process 540 may be implemented, at least in part, in the form of executable code stored on non-transient, tangible, machine readable media that when run by one or more processors (e.g., processor 312 in deployment platform 310) may cause the one or more processors to perform one or more of the processes 610-640.

At the process 610, dependency descriptors are searched for a class. As the AJVM loads classes on demand during process 540 using the class loader, the dependency descriptors loaded during process 520 are searched for the class. In some examples, a package associated with the class may be determined. In some examples, the dependency descriptors may be searched to select a dependency descriptor associated with the class. In some examples, the dependency descriptors may be consistent with the dependency descriptors of FIG. 1A and/or FIG. 1B. In some examples, a package associated with the class may be used to determine the dependency descriptor associated with the class.

At the process 620, information for the class is determined. Once the dependency descriptor associated with the class is determined, information for the class is determined. In some examples, the information for the class includes the dependency descriptor associated with the class. In some examples, the information for the class includes a package ID and a version for the package associated with the class. In some examples, the information for the class includes a group ID, an artifact ID, and the version for the package associated with the class. In some examples, the information associated with the class may include a class name for the class. In some examples, the information associated with the class may include an identity for a dependency cluster.

At the process 630, the class is requested from a dependency cluster. Based on the information associated with the class determined during process 620, a request is made to the dependency cluster (e.g., the dependency cluster 350). In some examples, the request may include the dependency descriptor associated with the class. In some examples, the request may include sufficient information associated with the class to unambiguously identify the class. In some examples, the request may be transmitted to the dependency cluster. In some examples, the request may be transmitted to any dependency node (e.g., dependency node 360 and/or 370) in the dependency cluster. In some examples, the request may be transmitted over a network (e.g., network 340). In some examples, when no response to the request is received, additional requests may be made to the same and/or different dependency nodes in the dependency cluster.

At the process 640, the class is received from the dependency cluster. After the request made during process 630 is received by the dependency cluster, the dependency cluster may locate and return a class file associated with the class to the class loader, which is then received by the class loader and/or the AJVM. In some examples, the class file may be assembled from one or more fragments by the dependency cluster. In some examples, the class file may be received from the dependency node to which the request was transmitted during process 630. In some examples, when the class is not received from the dependency cluster, the class loader may generate an error and/or throw a corresponding exception.

Figure 7:
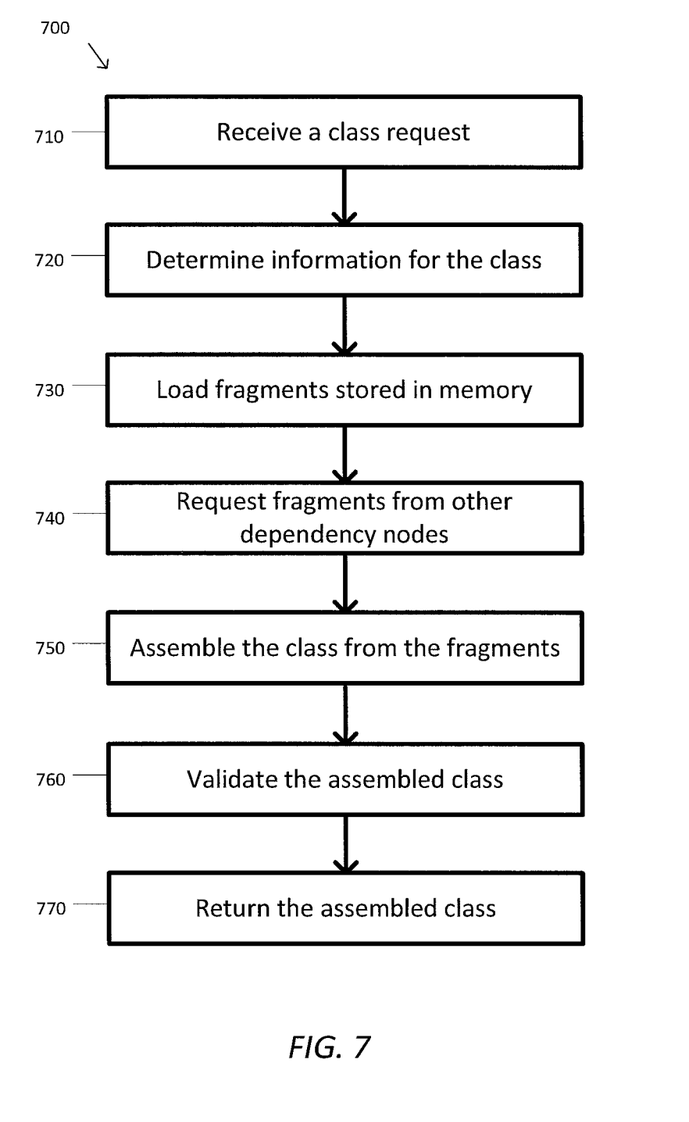
FIG. 7 is a simplified diagram of a method for processing class requests according to some examples.

FIG. 7 is a simplified diagram of a method 700 for processing class requests according to some examples. As shown in FIG. 7, the method 700 includes a process 710 for receiving a class request, a process 720 for determining information for the class, a process 730 for loading fragments stored in memory, a process 740 for requesting fragments from other dependency nodes, a process 750 for assembling the class from the fragments, a process 760 for validating the assembled class, and a process 770 for returning the assembled class. According to certain examples, the method 700 for processing class requests can be performed using variations among the processes 710-770 as would be recognized by one of ordinary skill in the art. In some examples, process 760 is optional and may be omitted. In some examples, one or more of the processes 710-770 of method 700 may be implemented, at least in part, in the form of executable code stored on non-transient, tangible, machine readable media that when run by one or more processors (e.g., control unit 362 in dependency node 360 and/or control unit 372 in dependency node 370) may cause the one or more processors to perform one or more of the processes 710-770.

At the process 710, a class request is received. In some examples, the class request may be received at a dependency node (e.g., dependency node 360 and/or 370). In some examples, the class request may be received from a class loader and/or an AJVM (e.g., as a result of process 630). In some examples, the class request may include sufficient information to identify the class. In some examples, the class request may include a dependency descriptor associated with the class.

At the process 720, information for the class is determined. In some examples, the information for the class may be extracted from the class request received during process 710. In some examples, the information for the class may include the dependency descriptor associated with the class. In some examples, the dependency descriptors may be consistent with the dependency descriptors of FIG. 1A and/or FIG. 1B. In some examples, the information for the class may be used to unambiguously identify the class.

At the process 730, fragments stored in memory are loaded. In some examples, the dependency node processing the class request received during process 710 may load any fragments associated with the class stored in the memory (e.g., memory 364 and/or memory 374) of the dependency node. In some examples, the fragments may be the fragments stored by the dependency node during process 460. In some examples, the dependency node may determine the fragments associated with the class by matching the information for the class determined during process 720 with tags for each of the fragments. In some examples, when a dependency descriptor in a tag is the same as the dependency descriptor associated with the class, the corresponding fragment is associated with the class. In some examples, the dependency node may not be storing any of the fragments associated with the class and no fragments are loaded during process 730.

At the process 740, fragments are requested from other dependency nodes. In some examples, the dependency node processing the class request may not be storing all of the fragments associated with the class and may request any remaining fragments from the other dependency nodes in a dependency cluster. In some examples, when the dependency node is storing all of the fragments associated with the class, process 740 may be skipped. In some examples, the dependency node may request fragments from the other dependency nodes by transmitting further class requests similar to the class request received during process 710 to the other dependency nodes. In some examples, the further class request may be transmitted over a network (e.g., cluster network 380). In some examples, the dependency node may request only fragments associated with the class that the dependency node is not storing. In some examples, one or more of the other dependency nodes may respond to the further class requests by returning corresponding fragments to the dependency node. In some examples, the other dependency nodes may satisfy the further class requests by recursively making further requests using process 740 (or a corresponding process).

At the process 750, the class is assembled from the fragments. In some examples, the fragments loaded during process 730 and the fragments received in response to the further class requests made during process 740 may be assembled to form the class. In some examples, the assembled class forms a class file. In some examples, a position of each fragment in the class file may be determined based on a starting byte and/or a fragment number included in a tag associated with the respective fragment.

At the optional process 760, the assembled class may be validated. In some examples, the class assembled during process 750 may be examined to validate that it is both complete and correct. In some examples, a total size of the assembled class may be compared to a total size included in one or more of the tags associated with the fragments. In some examples, a total number of fragments for the assembled class may be compared to a total number of fragments included in one or more of the tags associated with the fragments. In some examples, a validation code of the assembled class may be compared to a validation field included in one or more of the tags associated with the fragments. In some examples, when the assembled class is not validated, processes 730-760 may be repeated to assemble and revalidate the class using different fragments.

At the process 770, the assembled class is returned. The class assembled during process 750 is returned based on the request received during process 710. In some examples, the assembled class may be returned to the requesting class loader and/or AJVM. In some examples, the assembled class may be received by the requesting class loader and/or AJVM using process 640. In some examples, when the assembled class may not be returned, an error response is returned. In some examples, the assembled class may not be returned when the requested class cannot be found in the dependency cluster. In some examples, the assembled class may not be returned when the assembled class does not pass validation during process 760. In some examples, the assembled class may not be returned when one or more fragments associated with the class cannot be found.

According to certain examples, run-time dependency resolution may have one or more advantages. In some examples, dependencies are not resolved until a dependency is used by a project at run-time allowing execution of the project without first loading all of the classes referenced by a project. In some examples, memory on the deployment platform may be conserved because only those classes that are actually used during execution may be loaded to the deployment platform.

Some examples of a computer workstation, deployment platform 310, and/or dependency nodes 360 and/or 370 may include non-transient, tangible, machine readable media that include executable code that when run by one or more processors (e.g., processor 312 and/or one or more processors in control unit 362 and/or 372) may cause the one or more processors to perform the processes of methods 200, 400, 500, and/or 700 as described above. Some common forms of machine readable media that may include the processes of methods 200, 400, 500, and/or 700 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of run-time dependency resolution, the method comprising:
    loading one or more dependency descriptors from an archive file used to distribute a software project;
    determining that a class is to be loaded at run-time;
    selecting a first dependency descriptor from the one or more dependency descriptors based on information associated with the class;
    requesting the class from a dependency repository based on information associated with the class and information associated with the first dependency descriptor;
    receiving the class from the dependency repository;
    loading the class;
    determining a package for the dependency repository;
    loading the package;
    extracting a class file from the package;
    splitting the class file into one or more fragments based on a predetermined fragment size in bytes;
    tagging each of the one or more fragments with information associated with the class file and the package; and
    transmitting each of the one or more tagged fragments to the dependency repository.

2. The method of claim 1 wherein the archive file is selected from a group consisting of a Java archive (JAR), a web archive (WAR), and an enterprise archive (EAR).

3. The method of claim 1 wherein the information associated with the class includes a class name.

4. The method of claim 1 wherein the dependency repository is a dependency cluster having a plurality of dependency nodes.

5. The method of claim 4 wherein requesting the class from the dependency repository comprises requesting the class from a first one of the dependency nodes in the dependency cluster.

6. The method of claim 1 wherein the first dependency descriptor includes a project identifier and a version for a project associated with the class.

7. The method of claim 1 wherein the first dependency descriptor includes a group identifier, an artifact identifier, and a version for a project associated with the class.

8. The method of claim 1 wherein loading of the one or more dependency descriptors from the archive file comprises reading a dependency descriptor file stored in the archive file.

9. The method of claim 8 wherein the dependency descriptor file is stored in a metadata directory of the archive file.

10. The method of claim 1 wherein receiving the class from the dependency repository includes receiving a class file.

11. The method of claim 1 wherein the information associated with the package includes a second dependency descriptor associated with the package.

12. The method of claim 1 wherein transmitting each of the one or more tagged fragments to the dependency repository comprises transmitting each of the one or more tagged fragments to a number of dependency nodes in the dependency archive based on a replication factor.

13. A non-transitory machine-readable medium comprising a first plurality of machine-readable instructions which when executed by one or more processors associated with one or more computing systems are adapted to cause the one or more processors to perform a method comprising:
    loading one or more dependency descriptors from an archive file used to distribute a software project;
    determining that a class is to be loaded at run-time;
    selecting a first dependency descriptor from the one or more dependency descriptors based on information associated with the class;
    requesting the class from a dependency repository based on information associated with the class and information associated with the first dependency descriptor;
    receiving the class from the dependency repository;
    loading the class;
    determining a package for the dependency repository;
    loading the package;
    extracting a class file from the package;
    splitting the class file into one or more fragments based on a predetermined fragment size in bytes;
    tagging each of the one or more fragments with information associated with the class file and the package; and
    transmitting each of the one or more tagged fragments to the dependency repository.

14. A system for management of dependencies, the system comprising:
    a deployment platform including one or more processors and memory storing an archive; and
    a dependency cluster including a plurality of dependency nodes;
    wherein:
        the one or more processors are running an augmented Java virtual machine (AJVM) including a class loader;
        the class loader loads a class at run-time as requested by the AJVM by selecting a dependency descriptor for the class based on information associated with the class, requesting the class from a first dependency node selected from the plurality of dependency nodes, and receiving the class from the first dependency node; and
        the first dependency node:
            receives a request for the class from the class loader;
            determines information about the class from the request;
            loads zero or more first fragments from memory of the first dependency node based on the information about the class, each of the first fragments corresponding to a corresponding first portion of a class file split into fragments based on a predetermined fragment size in bytes;
            requests zero or more second fragments from other dependency nodes selected from the plurality of dependency nodes based on the information about the class, each of the second fragments corresponding to a corresponding second portion of the class file;
            assembles the class using the first fragments and the second fragments; and
            returns the assembled class.

15. The system of claim 14 wherein the first dependency node further validates the assembled class.

16. The system of claim 14 wherein the information about the class includes information associated with the selected dependency descriptor.

17. The system of claim 14 wherein the assembled class includes the class file.

* * * * *